US012789230B2

(12) United States Patent
Song et al.

(10) Patent No.: US 12,789,230 B2

(45) Date of Patent: Nov. 10, 2026

(54) AQUEOUS COMPOSITION FOR METALLIC SURFACE TREATMENT AND THE APPLICATION THEREOF

(71) Applicant: CHEMETALL GMBH, Frankfurt (DE)

(72) Inventors: Ming Juan Song, Shanghai (CN); Hai Xia Zou, Shanghai (CN); Jin Kai Huang, Shanghai (CN); Peng Xia, Shanghai (CN)

(73) Assignee: CHEMETALL GMBH, Frankfurt (DE)

( * ) Notice: Subject to any disclaimer, the term of this patent is extended or adjusted under 35 U.S.C. 154(b) by 475 days.

(21) Appl. No.: 18/556,479

(22) PCT Filed: May 4, 2022

(86) PCT No.: PCT/EP2022/061910

§ 371 (c)(1),
(2) Date: Oct. 20, 2023

(87) PCT Pub. No.: WO2022/238190

PCT Pub. Date: Nov. 17, 2022

(65) Prior Publication Data

US 2024/0181494 A1 Jun. 6, 2024

(51) Int. Cl.

*B05D 7/14* (2006.01)
*C09D 5/02* (2006.01)
*C09D 5/08* (2006.01)

(52) U.S. Cl.

CPC ............... *B05D 7/14* (2013.01); *C09D 5/024* (2013.01); *C09D 5/08* (2013.01); *B05D 2202/15* (2013.01); *B05D 2502/00* (2013.01)

(58) Field of Classification Search

CPC .. B05D 7/14; B05D 2202/15; B05D 2502/00; C08K 3/10; C08K 5/06; C08L 91/06; C09D 5/024; C09D 5/028; C09D 5/08; C09D 7/20; C09D 7/61; C09D 7/65; C09D 7/68; C09D 133/04

USPC ..................... 106/14.05, 14.11, 14.21, 14.34

See application file for complete search history.

(56) References Cited

U.S. PATENT DOCUMENTS

| | | | |
|---|---|---|---|
| 2004/0062873 A1 | 4/2004 | Jung et al. | |
| 2007/0125451 A1 | 6/2007 | Smith et al. | |
| 2014/0134368 A1* | 5/2014 | Domes | C09D 7/63 428/35.8 |

FOREIGN PATENT DOCUMENTS

| | | | | |
|---|---|---|---|---|
| CN | 100554389 C | 10/2009 | | |
| EP | 0264338 A2 | 4/1988 | | |
| JP | H06146002 A * | 5/1994 | | C23C 22/28 |
| JP | 2001214182 A | 8/2001 | | |

OTHER PUBLICATIONS

International Search Report and Written Opinion for corresponding PCT/EP22/61910, mailed Sep. 12, 2022, 9 pages.

* cited by examiner

*Primary Examiner* — William P Fletcher, III

(74) *Attorney, Agent, or Firm* — Armstrong Teasdale LLP

(57) ABSTRACT

Disclosed herein is an aqueous composition including components (A) from 10% to 35% by weight of acrylic resin without hydroxyl group, where the acrylic resin has an average particle diameter in a range of from 50 μm to 200 μm measured by dynamic light scattering according to ISO13321:2004, (B) from 0.1% to 4% by weight of a film-forming aid having a boiling point of no more than 300° C. under 1 atm, (C) from 1% to 8% by weight of a lubricant having an average particle diameter in a range of from 100 nm to 600 nm measured by dynamic light scattering according to ISO13321:2004, and (D) from 0.1% to 1% by weight of a water-soluble chromium compound, where its weight is calculated from the chromium element, and the weight percentages of all components are based on the total weight of the aqueous composition.

19 Claims, No Drawings

AQUEOUS COMPOSITION FOR METALLIC SURFACE TREATMENT AND THE APPLICATION THEREOF

CROSS-REFERENCE TO RELATED APPLICATIONS

This application is a U.S. National Phase Application of International Patent Application No. PCT/EP22/61910, filed May 4, 2022, which claims priority to Application No. PCT/CN21/92748, filed May 10, 2021, each of which is hereby incorporated by reference herein.

TECHNICAL FIELD

The present invention relates to an aqueous composition for metallic surface treatment and more specifically for surface treatment on stainless steel, galvanized steel and its alloys. The present invention also relates to a process of treating a metallic surface with the invented aqueous composition.

BACKGROUND

Compositions for metallic surfaces treatment are used onto surfaces of metals before painting or coating to form films and therefore the obtained metallic surfaces are enabled good performances in repaintability, resistance to darkening, corrosion, alkali, boiling water and solvents etc. The homogeneity of the formed films is significant to bring good properties to metallic surfaces.

In one example of industrial practice, treating metallic surfaces is carried out by rollers and comprises following steps: (1) contacting stainless steel pick-up roller in rotating with a composition for metallic surface treatment to adhere the composition to surfaces of the pick-up roller; (2) transferring the composition from surfaces of the pick-up roller to that of a polyurethane coating roller in synchronous rotation; and (3) transferring the composition from surfaces of the polyurethane coating roller to that of a quickly-moving metal sheet to finish the surface treatment. The metal sheet could be replaced by a sheet having metallic surfaces.

The temperature on surfaces of the stainless steel pick-up roller and the polyurethane coating roller will reach 50° C. or even higher in summer. Such a high temperature will lead to residues of the compositions on rollers, which leads to inhomogeneity of the films formed on the metallic surfaces after being treated. Furthermore, the composition residues increase roughness of the rollers and as a consequence, the rollers have to be replaced more frequently.

Some compositions have been developed to obtain homogeneous films after metallic surface treatment. For example, CN100554389C provided a polyurethane resin composition comprising (a) a polyurethane resin having polyester backbone part and polyether backbone part, a tensile strength at break of not less than 3.92 kN/cm$^2$ and a tensile elongation at break of not more than 50%, measured according to JISK 7113, and a glass transition temperature (Tg) of from 80° C. to 150° C. measured according to JISK 7121; (b) fine polyolefin resin particles having a melting point of from 70° C. to 160° C. and a particle diameter of from 0.5 μm to 5 μm; and (c) a colloidal silica having a particle diameter of from 5 nm to 50 nm. However, it is not applicable for scenario of using rollers.

Therefore, it is still required to provide a composition for metallic surface treatment that could be used for rollers and meanwhile could form homogeneous film and further bring excellent performances in repaintability, resistance to high temperature, darkening, corrosion, alkali, boiling-water and solvents etc.

SUMMARY OF THE INVENTION

In one aspect, the present invention provides an aqueous composition for metallic surface treatment, which is particularly suitable for roller application. The aqueous composition comprises components of:

(A) from 10% to 35% by weight of acrylic resin,
(B) from 0.1% to 4% by weight of a film-forming aid,
(C) from 1% to 8% by weight of a lubricant, and
(D) from 0.1% to 1% by weight of a water-soluble chromium compound wherein its weight is calculated from chromium element, and the weight percentage of all components are based on the total weight of the aqueous composition.

Preferably, the aqueous composition of the present invention further comprises component (E): from 3% to 10% by weight of a hydroxyl-donating compound, based on the total weight of the composition.

In another aspect, the present invention relates to a process of treating metallic surfaces with the invented aqueous composition comprising the step of i. optional pretreatment on metallic surface, and
ii. contacting metallic surface with the invented aqueous composition,
iii. forming a film onto metallic surface after the solvent of the aqueous composition is evaporated.

In another aspect, the present invention provides a metal having surfaces treated by the invented aqueous composition.

In a further aspect, the present invention relates to an article having a metal and its surface is treated by the invented aqueous composition.

The aqueous composition of the present invention has a decreased adhesion to stainless steel roller and polyurethane roller, which dramatically extends the lifetime of the rollers.

Furthermore, the film formed from the invented aqueous composition is homogeneous and shows excellent performances in repaintability, resistance to high temperature, darkening, corrosion, alkali, boiling water and solvents etc.

DETAILED DESCRIPTION OF THE INVENTION

The present invention now will be described more fully hereinafter, in which some, but not all embodiments of the inventions are shown. Indeed, this invention can be embodied in many different forms and should not be construed as limited to the embodiments set forth herein; rather, these embodiments are provided so that this disclosure will satisfy applicable legal requirements.

In the present disclosure, expressions “a”, “an”, “the”, when used to define a term, include both the plural and singular forms of the term.

The terms “comprise”, “comprising”, etc. are used interchangeably with “contain”, “containing”, etc. and are to be interpreted in a non-limiting, open manner. That is, e.g., further components or elements may be present. The expressions “consists of” or “consists essentially of” or cognates, if used, may be embraced within “comprises” or cognates.

The term “article” means an article made of a metal or an article having a metallic surface.

The term "metallic surface" means a surface of a metal or a surface made of a metal.

The term "film-forming" means the formation of a film from a material having a high polymer content, such as a polymer dispersion, in which process primarily polymer particles turn into a uniform film, preferably at room temperature (5-40° C.) or slightly elevated temperature.

The term "minimum film-forming temperature (MFT)" means the lowest temperature at which resin particles in an emulsion will form a continuous film that is measured according to GB/T 9267-1988.

The term "(meth)acrylate" means any acrylate and/or methacrylate monomer.

The term "acrylic resin" means any acrylic polymer and/or methacrylic polymer and the derivatives thereof.

The term "hydroxyl-donating compound" means a compound that is capable of providing hydroxyl groups.

All percentages and ratios regarding the composition are mentioned by weight unless otherwise indicated.

(A) Acrylic Resin

The aqueous composition of the present invention uses acrylic resin as a film-forming component. Acrylic resins capable of forming a film and applicable in a surface-treatment composition may be used in the present invention.

Suitable acrylic resins used as component (A) may be prepared from emulsion polymerization of monomers in the presence of a polymerization initiating agent. Typical initiating agents are known in the art and can be selected by persons skilled in the art.

There is no limitation on the emulsion polymerizations to prepare acrylic resins. Persons skilled in the art can select appropriate conditions and procedures for the emulsion polymerizations.

Monomers for preparing acrylic resin are known in the art, for example, methyl acrylate, methyl methacrylate, acrylic acid, methacrylic acid, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, amyl acrylate, amyl methacrylate, hexyl acrylate, hexyl methacrylate, ethylhexyl acrylate, ethylhexyl methacrylate, 3,3,5-trimethylhexyl acrylate, 3,3,5-trimethylhexyl methacrylate, stearyl acrylate, stearyl methacrylate, lauryl acrylate or lauryl methacrylate, cycloalkyl acrylates and/or cycloalkyl methacrylates, such as cyclohexyl (meth)acrylate, (meth)acrylate esters of alkyl-substituted cyclohexanol, and (meth)acrylate esters of alkanol-substituted cyclohexane, such as 2-tert-butyl and 4-tert-butyl cyclohexyl (meth)acrylate, 4-cyclohexyl-1-butyl (meth)acrylate, and 3,3,5,5,-tetramethyl cyclohexyl (meth) acrylate; isobornyl (meth)acrylate; isomenthyl (meth)acrylate; cyclopentyl (meth)acrylate, (meth)acrylate esters of alkyl-substituted cyclopentanols, and (meth)acrylate esters of alkanol substituted cyclopentanes; adamantanyl (meth) acrylates; cyclododecyl (meth)acrylate; cycloundecanemethyl (meth)acrylate; dicyclohexylmethyl (meth)acrylate; cyclododecanemethyl (meth)acrylate; menthyl (meth)acrylate; and the combinations thereof. In some embodiments, comonomers, for example styrenic monomers such as styrene and olefinically unsaturated silicon-containing monomers such as vinyltriacetoxysilane may also be added for copolymerization to prepare acrylic resins.

Preferably, the acrylic resin as component (A) in the aqueous composition has an average particle diameter in a range of from 50 μm to 200 μm, preferably from 50 μm to 100 μm measured by dynamic light scattering according to ISO13321:2004.

The acrylic resin as component (A) is added into the aqueous composition in form of aqueous emulsion. The amount of the acrylic resin as component (A) in the aqueous composition is calculated based on the weight of the acrylic resin in the emulsion. The suitable solid content of the aqueous acrylic resin emulsion may be in a range of from 20% to 60% by weight, preferably in a range of from 30% to 55% by weight, such as from 30% to 50% by weight or from 40 to 50% by weight based on the weight of the emulsion, measured according to GB/T20623-2006.

In one embodiment, the aqueous acrylic resin emulsion may be GS-354 commercially available from Changzhou Guangshu Chemical Technology, Jiangsu of China.

In some embodiments, the minimum film-forming temperature at 1 atm of the aqueous acrylic resin emulsion is in a range of from 20° C. to 50° C., such as from 25° C. to 40° C., preferably from 30° C. to 35° C.

As the film-forming component, the acrylic resin as component (A) is present in the aqueous composition in an amount of from 10% to 35% by weight, preferably from 15% to 26% by weight based on the total weight of the aqueous composition.

Suitable acrylic resins used as component (A) do not contain hydroxyl group in the molecule.

(B) Film-Forming Aid

The aqueous composition of the present invention comprises a film-forming aid as component (B).

Film-forming aid acts as a specific solvent which swells and softens the surface of the polymer particles and thus make it possible to change their geometries through melting the organic particles. Preferably, after evaporation of the water, the film-forming aids are almost evaporated and do not remain in the film permanently.

Film-forming aids are known in the art. For the purpose of the present invention, the film-forming aid as component (B) has a boiling point of no more than 300° C. under 1 atm, in particular in a range of from 100° C. to 250° C., such as from 150° C. to 250° C.

For example, the film-forming aid may be selected from a group consisting of ethylene glycol butyl ether, diethylene glycol butyl ether, ethylene glycol phenyl ether, propylene glycol butyl ether, dipropylene glycol butyl ether, tripropylene glycol butyl ether, propylene glycol phenyl ether, dipropylene glycol propyl ether and the combination thereof.

In some embodiments, component (B) is a film-forming aid having a static surface tension of from 20 mN/m to 50 mN/m, such as from 25 mN/m to 40 mN/m measured by DuNouy ring tensiometer.

The amount of component (B) in the aqueous composition is in a range of from 0.1% to 4%, preferably from 1% to 4% by weight based on the weight of the composition.

(C) Lubricant

A lubricant is added in the aqueous composition as component (C). At least one wax selected from a group consisting of paraffins, polyethylenes and polypropylenes may be used as lubricant. For example, at least one oxidized wax and/or at least one microcrystalline wax may be used in the present invention. In some embodiments, component (C) is at least one selected from a group consisting of paraffin, polyethylene wax, polypropylene wax, polytetrafluoroethylene wax, oxidized polyethylene wax or/and oxidized polypropylene wax.

For the purpose of the present invention, the average particle diameter of the lubricant particles is in a range of from 100 nm to 600 nm, preferably from 100 nm to 400 nm, such as from 100 nm to 200 nm, measured by dynamic light scattering according to ISO13321:2004.

Preferably, the lubricant used in the present invention has a melting point of from 100° C. to 160° C., such as from 100° C. to 150° C., measured according to ISO 11357-1-2016.

The amount of component (C) in the aqueous composition is in a range of from 1% to 8% by weight, preferably from 2% to 6% by weight, based on the total weight of the composition.

(D) Water-Soluble Chromium Compound

The aqueous composition of the present invention comprises a water-soluble chromium compound as component (D). The water-soluble chromium compounds commonly used in the treatment on metallic surfaces are applicable to the aqueous composition of the present invention. For example, the water-soluble chromium compound may be selected from a group consisting of chromium fluoride, chromium nitrate, chromium sulfate, chromic anhydride, ammonium chromate, and ammonium dichromate. In one embodiment of the present invention, the water-soluble chromium compound is ammonium chromate.

Component (D) is present in the aqueous composition of the present invention in an amount of from 0.1% to 1% by weight, based on the weight of the composition. The weight of Component (D) is calculated from that of chromium element. In one embodiment of the invention, the amount of component (D) is in a range of from 0.2% to 0.8% by weight, based on the weight of the aqueous composition.

In some embodiments, the amount of component (D) in the aqueous composition is in a range of from 1 g/L to 10 g/L, such as 2 g/L to 8 g/L.

(E) Hydroxyl-Donating Compound

Preferably, the aqueous composition of the present invention could further comprise a hydroxyl-donating compound as component (E). The hydroxyl-donating compound can be selected by persons skilled in the art provided that it will not bring negative effects to the functions of other components of the composition. For example, the hydroxyl-donating compound may be selected from hydroxyl-functional resins, such as hydroxyl-functional polyesters, hydroxyl-functional poly(meth)acrylates, and hydroxyl-functional polyurethanes etc.

The hydroxyl value of component (E) is in a range of from 3 mg KOH/g to 100 mg KOH/g, preferably from 20 mg KOH/g to 80 mg KOH/g, such as from 50 mg KOH/g to 70 mg KOH/g, measured according to DIN-53240.

When present, the amount of component (E) is in a range of from 3% to 10%, preferably from 3% to 8% by weight, based on the total weight of the aqueous composition.

(F) Additives

The aqueous composition of the present invention may further comprise additives as component (F) in proper amounts, such as defoaming agents, pigments and so on.

In some embodiments, the aqueous composition of the present invention further comprises pigments. Persons skilled in the art could select appropriate pigments according to specific applications.

When present, the amount of component (F) in the aqueous composition may be in a range of from 1% to 10%, such as from 3% to 7 by weight, based on the total weight of the aqueous composition.

The aqueous composition of the present invention may be applied by a process known in the art. For example, the aqueous composition of the present invention may be applied by roller coating, flow coating, blade coating, spattering, spraying, brushing or dipping, also dipping at elevated temperature of the aqueous composition, and by subsequent squeegeeing, for example with a roller.

The aqueous composition of the present invention is particularly suitable for being applied by a process wherein the use of a roller is involved, especially stainless steel roller and/or polyurethane roller.

The aqueous composition of the present invention is suitable for treating metals and especially suitable for treating stainless steel, galvanized steel and the alloys thereof.

Furthermore, articles having metallic surfaces, in particular metallic surfaces of stainless steel, galvanized steel and the alloys thereof, can be treated with the aqueous composition of the present invention. These articles can be wire, strip, sheet, cladding, screening, car body, a part of vehicle, trailer, caravan or flying body, a covering, housing, lamp, light, traffic light element, an item of furniture or furniture element, an element of domestic appliance, frame, profile, a formed part with complex geometry, a crash barrier element, radiator element or fencing element, a bumper, a part consisting of or having at least one pipe or/and profile, a window, door or bicycle frame, a wire winding and wire mesh.

EMBODIMENTS

Below embodiments further illustrate how this invention could be carried out.

Embodiment 1

An aqueous composition for metallic surface treatment comprising components of:

(A) from 10% to 35%, preferably from 15% to 26% by weight of acrylic resin without hydroxyl group, wherein said acrylic resin has an average particle diameter in a range of from 50 μm to 200 μm, preferably from 50 μm to 100 μm measured by dynamic light scattering according to ISO13321:2004, (B) from 0.1% to 4%, preferably from 1% to 4% by weight of a film-forming aid having a boiling point of no more than 300° C. under 1 atm and more preferably in a range of from 100° C. to 250° C., (C) from 1% to 8%, preferably from 2% to 6% by weight of a lubricant having an average particle diameter in a range of from 100 nm to 600 nm, preferably in a range of from 100 nm to 400 nm measured by dynamic light scattering according to ISO13321:2004, and (D) from 0.1% to 1%, preferably from 0.2% to 0.8% by weight of a water-soluble chromium compound, wherein its weight is calculated from the chromium element, and the weight percentages of all components are based on the total weight of the aqueous composition.

Embodiment 2

The aqueous composition of embodiment 1, wherein component (A) is in a form of aqueous emulsion having a minimum film-forming temperature at 1 atm in a range of from 20° C. to 50° C., preferably in a range of from 25° C. to 40° C. and more preferably in a range of from 30° C. to 35° C. according to GB/T 9267-1988.

Embodiment 3

The aqueous composition of any one of embodiments 1 to 2, wherein component (B) has a static surface tension of from 20 mN/m to 50 mN/m, preferably from 25 mN/m to 40 mN/m measured by DuNouy ring tensiometer.

Embodiment 4

The aqueous composition of any one of embodiments 1 to 3, wherein component (C) has a melting point of from 100° C. to 160° C. measured according to ISO 11357-1-2016.

Embodiment 5

The aqueous composition of any one of embodiments 1 to 4, wherein it further comprises component (E):

from 3% to 10%, preferably from 3% to 8% by weight of a hydroxyl-donating compound, wherein said hydroxyl-donating compound has a hydroxyl value in a range of from 3 mg KOH/g to 100 mg KOH/g, preferably from 20 mg KOH/g to 80 mg KOH/g measured according to DIN-53240 and the weight percentage of component (E) is based on the total weight of the aqueous composition.

Embodiment 6

The aqueous composition of embodiment 5, wherein said hydroxyl-donating compound is at least one selected from hydroxyl-functional resins, preferably at least one selected from a group consisting of hydroxyl-functional polyesters, hydroxyl-functional poly(meth)acrylates and hydroxyl-functional polyurethanes.

Embodiment 7

The aqueous composition of any one of embodiments 1 to 6, wherein it further comprises component (F):

from 1% to 10%, preferably from 3% to 7% by weight of additive, preferably said additive is at least one selected from defoaming agents and pigments, and the weight percentage of component (F) is based on the total weight of the aqueous composition.

Embodiment 8

A process of metallic surface treatment comprising steps of i. optional pretreatment on metallic surface, and
ii. contacting metallic surface with the aqueous composition of any one of embodiments 1 to 7,
iii. forming a film onto metallic surface after the solvent of the aqueous composition is evaporated.

Embodiment 9

A metal having surface treated with the aqueous composition of any one of embodiments 1 to 7.

Embodiment 10

The metal of embodiment 9, preferably selected from stainless steel, galvanized steel and its alloys.

Embodiment 11

An article having a metal of any one of embodiments 8 to 9.

EXAMPLES

The present invention will be better understood in view of the following non-limiting examples.

Metal Substrate Used in Examples

In examples, a hot-dip Al—Zn-galvanized steel sheet (55% Al-1.6% Si—Zn), double-side galvanized, having a galvanizing amount of 100 g/$m^2$ is used as the metal substrate.

Preparation of Aqueous Compositions

All components list in Table A in the amounts of Tables 1 and 4 are added into deionized water under stirring to form aqueous compositions.

TABLE A

Materials used in the examples

| Component | | Material and Description |
|---|---|---|
| A | | GS-354, aqueous acrylic resin polymer emulsion, commercially available from Changzhou Guangshu Chemical Technology, Jiangsu China; minimum film-forming temperature: 32° C.; solid content: 42 ± 1%, particle diameter: 50 to 100 µm |
| B | B1 | A film-forming aid, tripropylene glycol butyl ether (TPNB), boiling point at 760 mm Hg: 276° C., static surface tension: 29.7 mN/m |
| | B2 | A film-forming aid, dipropylene glycol butyl ether (DPNB), boiling point at 760 mm Hg: 228° C., static surface tension: 28.4 mN/m |
| | B3 | A film-forming aid, propylene glycol, boiling point at 760 mm Hg: 187.3° C., static surface tension: 36 mN/m |
| | B4 | A film-forming aid, isopropanol, boiling point at 760 mm Hg: 80-90° C., static surface tension: 21.7 mN/m |
| C | C1 | Polyethylene wax, non-ionic, melting point according to ISO 11357-1-2016: 125° C., particle diameter according to DLS: 125 nm |
| | C2 | Polyethylene wax, cationic, melting point according to ISO 11357-1-2016: 125° C., particle diameter according to DLS: 125 nm |
| | C3 | Ultralube ®E-8046S, commercially available from Keim-Additec Surface, Kirchberg, Germany, melting point according to ISO 11357-1-2016: 134° C., particle diameter according to DLS: 524 nm. |
| D | D1 | Polyhydroxyl acrylic dispersion (solid content: 50%), hydroxyl value: 60-70 mg KOH/g |
| | D2 | Polyhydroxyl acrylic resin, hydroxyl value: 230-250 mg KOH/g |
| | D3 | Polyhydroxyl acrylic dispersion (solid content: 50%), hydroxyl value: 25-35 mg KOH/g |
| E | | 31.6% aqueous solution of ammonium chromate |

Treatment on Metallic Surfaces with Aqueous Compositions

The metallic surfaces are treated with an aqueous composition in a process comprising steps of:

a) cleaning the metallic surfaces of a metal substrate with a degreaser (1.5 wt % aqueous solution of Gardoclean® S5185 commercially available from Chemetall, Shanghai, China) at 55° C. for 10 to 15 seconds to remove grease, and rinsing the metallic surfaces with water until a continuous water film is formed, and subsequently drying the metallic surfaces with hot air; and b) applying the aqueous composition to the degreased metallic surfaces by a bar applicator under room temperature (5-40° C.), and drying the metallic surfaces in an air circulating oven at 280° C. for 5 to 10 seconds, wherein the surface temperature of the metal substrate is kept at 90° C. or so in the oven.

Performance Tests

Properties of an aqueous composition such as volatilization speed and adhesion to polyurethane roller and stainless-steel roller, and the properties of a treated metallic surface such as corrosion resistance, darkening resistance, alkali resistance, solvent resistance, heat resistance, boiling water resistance, and repaintability are tested. The test results are summarized in Tables 2, 3 and 5.

Below marks in each and every property test are interpreted as follows:

◎: Excellent;

○: good;

Δ: acceptable;

X: does not meet the requirement.

<Corrosion Resistance>

Corrosion resistance is evaluated by neural salt spraying test (NSST) method according to GB/T 10125-2012 for 500 hours.

Results are rated as follows:

◎: white rust area<0.5%;

○: White rust area≥0.5% and <2.0%;

Δ: White rust area≥2.0% and <5.0%;

X: White rust area≥5.0%.

<Darkening Resistance>

Darkening resistance is evaluated as follows:

measuring the parameters L, a and b of the treated metallic surface of a metal substrate by ColorFlex Spectrocolorimeter (commercially available from Hunter Associates Laboratory, VA, US, same ColorFlex Spectrocolorimeter is used hereinafter); and placing the metal substrate in a chamber having constant temperature of 50° C. and relative humidity of 98% for 500 hours; and measuring again the parameters L, a and b of the treated metallic surface to determine color difference ΔE value according to formula $$\Delta E^*_{ab} = \sqrt{(L^*_2 - L^*_1)^2 + (a^*_2 - a^*_1)^2 + (b^*_2 - b^*_1)^2}.$$

Results are rated as follows:

◎: ΔE≥0 and <1;

○: ΔE≥1 and <2;

Δ: ΔE≥2 and <3;

X: ΔE≥3.

<Alkali Resistance>

Alkali resistance is evaluated as follows:

measuring the parameters L, a and b of the treated metallic surface of a metal substrate by ColorFlex Spectrocolorimeter; and placing the metal substrate in a 0.1 wt % aqueous NaOH solution at room temperature (5-40° C.) for 1 hour; then taking out the metal substrate, washing it by water and drying; and then measuring again the parameters L, a and b of the treated metallic surface to determine color difference ΔE value.

Results are rated as follows:

◎: ΔE≥0 and <1;

○: ΔE≥1 and <2;

Δ: ΔE≥2 and <3;

X: ΔE≥3.

<Solvent Resistance>

Solvent resistance is evaluated as follows:

measuring the parameters L, a and b of the treated metallic surface of a metal substrate by ColorFlex Spectrocolorimeter; and pressing a gauze impregnated with 80% by weight of ethanol in a load of 1.5 kg onto the treated metallic surface, wiping back and forth for 20 times; and measuring again the parameters L, a and b of the wiped surface of metal substrate to determine color difference ΔE value.

Results are rated as follows:

◎: ΔE≥0 and <1;

○: ΔE≥1 and <2;

Δ: ΔE≥2 and <3;

X: ΔE≥3.

<Heat Resistance>

Heat resistance is evaluated as follows:

measuring the parameters L, a and b of the treated metallic surface of a metal substrate by ColorFlex Spectrocolorimeter;

placing the metal substrate in an oven at 200° C. for 30 minutes; and taking it out and cooling it to room temperature (5-40° C.); and measuring again the parameters L, a and b of the treated metallic surface to determine color difference ΔE value.

Results are rated as follows:

◎: ΔE≥0 and <1;

○: ΔE≥1 and <2;

Δ: ΔE≥2 and <3;

X: ΔE≥3.

<Boiling Water Resistance>

Boiling-water resistance is evaluated as follows:

measuring the parameters L, a and b of the treated metallic surface of a metal substrate by ColorFlex Spectrocolorimeter;

placing the metal substrate into a container filled by boiling water and keeping the water boiling for 1 hour, wherein the metal substrate is partially immersed into the boiling water (boiling water-treated part of the metal substrate) and the upper part of the metal substrate is out of water (steam-treated part of the metal substrate); and taking the whole metal substrate out from the water and cooling it to room temperature (5-40° C.); and measuring the parameters L, a and b of the treated metallic surface of the boiling water-treated part of the metal substrate and of the treated metallic surfaces of the steam-treated part of the metal substrate respectively (hereinafter referred to as "immersed part" and "not immersed part"), by ColorFlex Spectrocolorimeter, to determine the color difference ΔE values of the "immersed part" and "not immersed part" respectively.

Results are rated as follows:

◎: ΔE of both immersed part and not immersed part≥0 and <1;

○: ΔE of both immersed part and not immersed part≥1 and <2;

Δ: ΔE of both immersed part and not immersed part≥2 and <3;

X: ΔE of both immersed part and not immersed part≥3.

<Repaintability>

Repaintability is evaluated as follows:

spraying a polyurethane powdered coating material INTERPON D34, commercially available from Akzonobel, Suzhou, China, onto the treated metallic surface of a metal substrate; and curing the coating material at 190° C. for 10 minutes to form a coating film having a thickness of from 60 to 80 μm; and measuring the adhesion between coating film and the treated metallic surface by cross cut test according to GB-T9286-1998 and the impact according to GB-T1732-93.

Results are rated as follows:

◎: cells falling≤5%, no cracking by impact test;

○: cells falling>5% and ≤15%, no cracking by impact test;

Δ: cells falling>15% and ≤35%, with cracking by impact test; and

X: cells falling>35%, with cracking by impact test.

<Volatilization Speed>

Volatilization speed is measured by the instrument Sartourius MA150 using auto model at 100° C. with the procedure as follows:

dropping about 0.3 g of an aqueous composition onto Mettler HA-D90 aluminum foil tray on the instrument and making the composition spread on the tray evenly; and recording the actual initial weight of the aqueous composition and the evaporated weight (%) every 30 seconds;

normalizing the measured data to 0.3 g and calculating the normalized evaporated weight (%);

calculating the evaporated weight according to the formula:

evaporated weight=0.3 g*normalized evaporated weight (%); and calculating the volatilization speed according to the formula:

volatilization speed=evaporated weight/(area*time), wherein the area is calculated from 3.14*4.5 cm*4.5 cm=63.585 $cm^2$.

Results are rated as follows:

volatilization speed ($g/m^2*s$) at 0.5 min:

◎: 0.140-0.200;

○: 0.080-0.140;

Δ: 0.200-0.260; and

X: >0.260.

volatilization speed ($g/m^2*s$) at 1.0 min:

◎: 0.280-0.310;

○: 0.250-0.280;

Δ: 0.310-0.340; and

X: >0.340.

<Adhesion to Polyurethane Roller and Stainless-Steel Roller>

Adhesion to polyurethane roller and stainless-steel roller are evaluated using a new and clean stainless-steel pick-up roller (with microporous treatment Cr-plated surface, Ra: 4~5 μm; Hardness: HRc 40~50) and a new and clean polyurethane coating roller (with polyurethane surface, Ra: 0.6~1.0 μm; Hardness: HRc 50~60), by a process comprising steps of:

contacting an aqueous composition with a rotating pick-up roller to adhere the composition to the surface of the pick-up roller; and transferring the aqueous composition from the pick-up roller to the rotating coating roller; and transferring the aqueous composition from the coating roller to a metal sheet in quick moving.

Results are rated as follows:

◎: after using the roller for 7 days, the surface of the pick-up roller or the coating roller is bright, has no change in color and no adhesion of the composition;

○: after using the roller for 3 days, the surface of the pick-up roller or the coating roller is bright, has black stripes and few adhesions of the composition;

Δ: after using the roller for 3 days, the surface of the pick-up roller or the coating roller becomes dark, has plenty of adhesions of the composition, and the roller can not be used any longer; and X: after using the roller for 1 days, the surface of the pick-up roller or the coating roller becomes dark, has plenty of adhesions of the composition, and the roller can not be used any longer.

Example 1

A series of aqueous compositions are prepared according to the formulations provided in table 1, wherein compositions 1 to 7 and 9-10 are aqueous compositions of the present invention while compositions 8 and 11-13 are comparative compositions. For each composition, the amounts are provided in % by weight and the balance is water.

TABLE 1

| | Component | | | | | | | | |
|---|---|---|---|---|---|---|---|---|---|
| | | B | | | | C | | | |
| No. | A | B1 | B2 | B3 | B4 | C1 | C2 | C3 | E |
| 1 | 50% | 1% | — | 2.5% | — | — | 4% | — | 5% |
| 2 | 50% | 1% | — | 2% | — | — | 4% | 1% | 5% |
| 3 | 50% | 1% | — | 2% | — | — | 4% | — | 5% |
| 4 | 50% | 1% | 0.3% | 2% | — | 4% | — | — | 5% |
| 5 | 50% | 1% | — | 2.5% | — | 4% | — | — | 5% |
| 6 | 50% | 1% | 0.3% | 2.5% | — | 4% | — | — | 5% |
| 7 | 50% | 1% | 0.5% | 2.5% | — | 4% | — | — | 5% |
| 8 | 50% | 1% | 0.8% | 2.5% | — | 4% | — | — | 5% |
| 9 | 50% | 0.5% | 0.5% | 2.5% | — | 4% | — | — | 5% |
| 10 | 50% | 0.5% | 0.8% | 2.5% | — | 4% | — | — | 5% |
| 11 | 50% | — | — | 2.5% | 1% | — | — | — | 5% |
| 12 | 50% | — | 1% | — | 1% | — | — | — | 5% |
| 13 | 50% | — | 0.5% | 2.5% | 1% | — | — | — | 5% |

The test results of the aqueous compositions and formed films are summarized in tables 2 and 3.

TABLE 2

| No. | | 1 | 2 | 3 | 4 | 5 | 6 | 7 | 8 | 9 | 10 | 11 | 12 | 13 |
|---|---|---|---|---|---|---|---|---|---|---|---|---|---|---|
| Actually measured | initial weight g | 0.339 | 0.311 | 0.318 | 0.345 | 0.354 | 0.333 | 0.344 | 0.325 | 0.334 | 0.328 | 0.324 | 0.333 | 0.335 |
| | 0.5 min, evaporated weight % | 18.29 | 17.04 | 14.78 | 14.20 | 7.91 | 6.61 | 13.66 | 19.69 | 15.27 | 15.45 | 18.71 | 19.82 | 18.21 |
| | 1 min, evaporated weight % | 48.26 | 44.69 | 41.51 | 42.32 | 40.11 | 39.04 | 41.28 | 46.77 | 45.81 | 46.34 | 51.54 | 50.15 | 49.25 |
| Normalized | weight g | 0.3 | 0.3 | 0.3 | 0.3 | 0.3 | 0.3 | 0.3 | 0.3 | 0.3 | 0.3 | 0.3 | 0.3 | 0.3 |
| | 0.5 min, evaporated weight % | 16.19 | 16.44 | 13.94 | 12.35 | 6.88 | 5.95 | 11.91 | 18.18 | 13.72 | 14.13 | 17.32 | 17.86 | 16.31 |
| | 1 min, evaporated weight % | 42.71 | 43.11 | 39.16 | 36.80 | 34.88 | 35.17 | 36.00 | 43.17 | 41.15 | 42.38 | 47.72 | 45.18 | 44.10 |
| volatilization speed | 0.5 min | 0.255 | 0.258 | 0.219 | 0.194 | 0.108 | 0.094 | 0.187 | 0.286 | 0.216 | 0.222 | 0.272 | 0.281 | 0.256 |
| | 1 min | 0.336 | 0.339 | 0.308 | 0.289 | 0.274 | 0.277 | 0.283 | 0.339 | 0.324 | 0.333 | 0.375 | 0.355 | 0.347 |

TABLE 3

| No. | Volatilization Speed 0.5 min | Volatilization Speed 1.0 min | Corrosion resistance | Darkening resistance | Alkali resistance | Solvent resistance | Heat resistance | Repaintability |
|---|---|---|---|---|---|---|---|---|
| 1 | Δ | Δ | ◎ | ◎ | ◎ | ◎ | ◎ | ◎ |
| 2 | Δ | Δ | ◎ | ◎ | ◎ | ◎ | ◎ | ◎ |
| 3 | Δ | ◎ | ◎ | ◎ | ◎ | ◎ | ◎ | ◎ |
| 4 | ◎ | ◎ | ◎ | ◎ | ◎ | ◎ | ◎ | ◎ |
| 5 | ○ | ○ | ◎ | ◎ | ○ | ◎ | ◎ | ◎ |
| 6 | ○ | ○ | ◎ | ◎ | ○ | ◎ | ◎ | ◎ |
| 7 | ◎ | ◎ | ◎ | ◎ | ○ | ◎ | ◎ | ◎ |
| 8 | X | Δ | ◎ | ◎ | ○ | ◎ | ◎ | ◎ |
| 9 | Δ | Δ | ◎ | ◎ | ○ | ◎ | ◎ | ◎ |
| 10 | Δ | Δ | ◎ | ◎ | ○ | ◎ | ◎ | ◎ |
| 11 | X | X | ◎ | ◎ | ○ | ◎ | ◎ | ◎ |
| 12 | X | X | ◎ | ◎ | ○ | ◎ | ◎ | ◎ |
| 13 | Δ | X | ◎ | ◎ | ○ | ◎ | ◎ | ◎ |

Example 2

A series of aqueous compositions are prepared according to the formulations provided in table 4, wherein compositions 1, 2, 4, and 5 are aqueous compositions of the present invention while compositions 3 and 6 to 14 are comparative compositions. For each composition, the amounts are provided in % by weight and the balance is water. 5

TABLE 4

| | Component | | | | | | | |
|---|---|---|---|---|---|---|---|---|
| | | | | D | | | | |
| No. | A | B3 | C2 | D1 | D2 | D3 | D4 | E |
| 1 | 45% | 2.5% | 4% | 7% | — | — | — | 5% |
| 2 | 45% | 2.5% | 3% | 7% | — | — | — | 5% |
| 3 | 45% | 2.5% | 4% | 5% | — | — | — | 5% |

TABLE 4-continued

| | Component | | | | | | | |
|---|---|---|---|---|---|---|---|---|
| | | | | D | | | | |
| No. | A | B3 | C2 | D1 | D2 | D3 | D4 | E |
| 4 | 40% | 2.5% | 4% | 10% | — | — | — | 5% |
| 5 | 35% | 2.5% | 4% | 15% | — | — | — | 5% |
| 6 | 45% | 2.5% | 4% | 3% | — | — | — | 5% |
| 7 | 40% | 2.5% | 4% | — | 1% | — | — | 5% |
| 8 | 35% | 2.5% | 4% | — | 3% | — | — | 5% |
| 9 | 50% | 2.5% | 4% | — | 5% | — | — | 5% |
| 10 | 45% | 2.5% | 4% | — | 10% | — | — | 5% |
| 11 | 40% | 2.5% | 4% | — | 15% | — | — | 5% |
| 12 | 50% | — | — | — | — | 10% | — | 5% |
| 13 | 45% | — | — | — | — | 20% | — | 5% |
| 14 | 40% | — | — | — | — | 30% | — | 5% |

The test results of the aqueous compositions and formed films are summarized in table 5.

TABLE 5

| No. | Adhesion to polyurethane roller | adhesion to stainless-steel roller | Corrosion resistance | Darkening resistance | Alkali resistance | Solvent resistance | Heat resistance | Boiling-water resistance | Repaint-ability |
|---|---|---|---|---|---|---|---|---|---|
| 1 | ○ | ○ | ○ | ○ | ◎ | ◎ | ○ | Δ | ◎ |
| 2 | ○ | ○ | ○ | ○ | ◎ | ◎ | ○ | Δ | ◎ |
| 3 | X | Δ | ○ | ○ | ◎ | ◎ | ○ | Δ | ◎ |
| 4 | ◎ | ◎ | ○ | ○ | ◎ | ◎ | ○ | Δ | ◎ |
| 5 | ◎ | ◎ | ○ | ○ | ◎ | ◎ | ○ | ○ | ◎ |

TABLE 5-continued

| No. | Adhesion to polyurethane roller | adhesion to stainless-steel roller | Corrosion resistance | Darkening resistance | Alkali resistance | Solvent resistance | Heat resistance | Boiling-water resistance | Repaint-ability |
|---|---|---|---|---|---|---|---|---|---|
| 6 | X | Δ | ○ | ◎ | Δ | ◎ | ◎ | Δ | N.A. |
| 7 | X | X | ○ | ◎ | Δ | ◎ | ◎ | ○ | N.A. |
| 8 | X | Δ | ○ | ○ | X | ◎ | ○ | ○ | N.A. |
| 9 | ○ | ○ | Δ | ◎ | X | ○ | ○ | X | N.A. |
| 10 | ○ | ○ | Δ | ○ | X | ◎ | ◎ | X | N.A. |
| 11 | ○ | ○ | Δ | ○ | X | ◎ | ○ | ○ | N.A. |
| 12 | ◎ | ◎ | ○ | Δ | X | ○ | ○ | Δ | N.A. |
| 13 | ◎ | ◎ | X | ○ | X | Δ | ○ | ○ | N.A. |
| 14 | ◎ | ◎ | X | ○ | X | ○ | ○ | ○ | N.A. |

The invention claimed is:

1. An aqueous composition for metallic surface treatment comprising components of:

(A) from 10% to 35% by weight of acrylic resin without hydroxyl group, wherein said acrylic resin has an average particle diameter in a range of from 50 μm to 200 μm measured by dynamic light scattering according to ISO13321:2004, (B) from 0.1% to 4% by weight of a film-forming aid having a boiling point of no more than 300° C. under 1 atm, (C) from 1% to 8% by weight of a lubricant having an average particle diameter in a range of from 100 nm to 600 nm measured by dynamic light scattering according to ISO13321:2004, (D) from 0.1% to 1% by weight of a water-soluble chromium compound, and (E) from 3% to 10% by weight of a hydroxyl-donating compound, wherein the hydroxyl-donating compound has a hydroxyl value in a range of from 3 mg KOH/g to 100 mg KOH/g measured according to DIN-53240 and the weight percentage of component (E) is based on the total weight of the aqueous composition, wherein the weight of the water-soluble chromium compound is calculated from the chromium element, and the weight percentages of all components are based on the total weight of the aqueous composition.

2. The aqueous composition according to claim 1, wherein the component (A) is in a form of an aqueous emulsion having a minimum film-forming temperature at 1 atm in a range of from 20° C. to 50° C. according to GB/T 9267-1988.

3. The aqueous composition according to claim 1, wherein the component (B) has a static surface tension of from 20 mN/m to 50 mN/m measured by DuNouy ring tensiometer.

4. The aqueous composition according to claim 1, wherein the component (C) has a melting point in a range of from 100° C. to 160° C. measured according to ISO 11357-1-2016.

5. The aqueous composition according to claim 1, wherein the hydroxyl-donating compound is at least one selected from the group consisting of hydroxyl-functional resins.

6. The aqueous composition according to claim 1, wherein it further comprises from 1% to 10% by weight of component (F): an additive, and the weight percentage of component (F) is based on the total weight of the aqueous composition.

7. A process of metallic surface treatment comprising steps of:

i. optional pretreatment on a metallic surface, ii. contacting the metallic surface with the aqueous composition according to claim 1, and iii. forming a film onto the metallic surface after the solvent of the aqueous composition is evaporated.

8. A metal having a surface treated with the aqueous composition according to claim 1.

9. The metal according to claim 8, wherein the metal is selected from the group consisting of stainless steel, galvanized steel and its alloys.

10. An article having a metal according to claim 8.

11. The aqueous composition for metallic surface treatment according to claim 1, wherein the composition comprises components of:

(A) from 15% to 26% by weight of the acrylic resin without hydroxyl group, wherein said acrylic resin has an average particle diameter in a range of from 50 μm to 100 μm measured by dynamic light scattering according to ISO13321:2004, (B) from 1% to 4% by weight of the film-forming aid having a boiling point of no more than 300° C. under 1 atm, (C) from 2% to 6% by weight of the lubricant having an average particle diameter in a range of from 100 nm to 400 nm measured by dynamic light scattering according to ISO13321:2004, (D) from 0.2% to 0.8% by weight of a water-soluble chromium compound, and (E) from 3% to 10% by weight of a hydroxyl-donating compound, wherein the hydroxyl-donating compound has a hydroxyl value in a range of from 3 mg KOH/g to 100 mg KOH/g measured according to DIN-53240 and the weight percentage of component (E) is based on the total weight of the aqueous composition, wherein the weight of the water-soluble chromium compound is calculated from the chromium element, and the weight percentages of all components are based on the total weight of the aqueous composition.

12. The aqueous composition according to claim 1, wherein the component (A) is in a form of aqueous emulsion having a minimum film-forming temperature at 1 atm in a range of from 25° C. to 40° C. according to GB/T 9267-1988.

13. The aqueous composition according to claim 1, wherein the component (A) is in a form of aqueous emulsion having a minimum film-forming temperature at 1 atm in a range of from 30° C. to 35° C. according to GB/T 9267-1988.

14. The aqueous composition according to claim 1, wherein the component (B) has a static surface tension of from 25 mN/m to 40 mN/m measured by DuNouy ring tensiometer.

15. The aqueous composition according to claim 1, wherein it further comprises in a range of from 3% to 8% by weight of component (E): a hydroxyl-donating compound, wherein said hydroxyl-donating compound has a hydroxyl value in a range of from 20 mg KOH/g to 80 mg KOH/g measured according to DIN-53240 and the weight percentage of component (E) is based on the total weight of the aqueous composition.

16. The aqueous composition according to claim 1, wherein the hydroxyl-donating compound is at least one selected from the group consisting of hydroxyl-functional polyesters.

17. The aqueous composition according to claim 1, wherein the hydroxyl-donating compound is at least one selected from the group consisting of hydroxyl-functional poly(meth)acrylates.

18. The aqueous composition according to claim 1, wherein the hydroxyl-donating compound is at least one selected from the group consisting of hydroxyl-functional polyurethanes.

19. The aqueous composition according to claim 1, wherein it further comprises from 3% to 7% by weight of component (F): an additive, the additive is at least one selected from the group consisting of defoaming agents and pigments, and the weight percentage of component (F) is based on the total weight of the aqueous composition.

* * * * *